United States Patent
Uchida et al.

(10) Patent No.: US 10,325,293 B2
(45) Date of Patent: Jun. 18, 2019

(54) INFORMATION PROCESSING DEVICE, DISPLAY CONTROL METHOD, PROGRAM AND STORAGE MEDIUM

(71) Applicant: Rakuten, Inc., Tokyo (JP)

(72) Inventors: Yuki Uchida, Tokyo (JP); Takao Oyobe, Tokyo (JP)

(73) Assignee: Rakuten, Inc., Tokyo (JP)

( * ) Notice: Subject to any disclaimer, the term of this patent is extended or adjusted under 35 U.S.C. 154(b) by 347 days.

(21) Appl. No.: 15/111,679

(22) PCT Filed: Jan. 17, 2014

(86) PCT No.: PCT/JP2014/050758
§ 371 (c)(1),
(2) Date: Jul. 14, 2016

(87) PCT Pub. No.: WO2015/107670
PCT Pub. Date: Jul. 23, 2015

(65) Prior Publication Data
US 2016/0328755 A1 Nov. 10, 2016

(51) Int. Cl.
*G06Q 30/00* (2012.01)
*G06Q 30/02* (2012.01)
*G06F 16/958* (2019.01)
*G06F 3/0485* (2013.01)
*H04L 29/08* (2006.01)
*G06F 3/14* (2006.01)
*G09G 5/14* (2006.01)
*G09G 5/34* (2006.01)

(52) U.S. Cl.
CPC ....... *G06Q 30/0277* (2013.01); *G06F 3/0485* (2013.01); *G06F 3/14* (2013.01); *G06F 16/958* (2019.01); *G09G 5/14* (2013.01); *G09G 5/34* (2013.01); *H04L 67/02* (2013.01); *G09G 2370/027* (2013.01)

(58) Field of Classification Search
CPC ............... G06F 17/00–17/28; G06F 3/00; G06F 3/048
USPC ........................ 705/14; 715/200, 240, 243
See application file for complete search history.

(56) References Cited

U.S. PATENT DOCUMENTS

2012/0290971 A1  11/2012  Takami
2017/0115842 A1* 4/2017  Yin ................. G06F 3/0485

FOREIGN PATENT DOCUMENTS

| JP | 2013-57918 A  | 3/2013  |
| TW | 201324324 A1  | 6/2013  |
| WO | 2011/142486 A1 | 11/2011 |

* cited by examiner

*Primary Examiner* — Yehdega Retta
(74) *Attorney, Agent, or Firm* — Sughrue Mion, PLLC

(57) ABSTRACT

In an information processing device performing display control for a web page having at least a first advertisement frame and a second advertisement frame placed below the first advertisement frame as advertisement frames in which advertisements are displayed, the device causes the first advertisement frame to follow scrolling in response to a display reference position in a web page display frame of a web browser reaching a first follow-start position for the first advertisement frame as the web page is scrolled in the web page display frame, and causes the second advertisement frame to follow the scrolling in response to the display reference position reaching a second follow-start position for the second advertisement frame after termination of the following of the first advertisement frame.

7 Claims, 12 Drawing Sheets

Fig.6
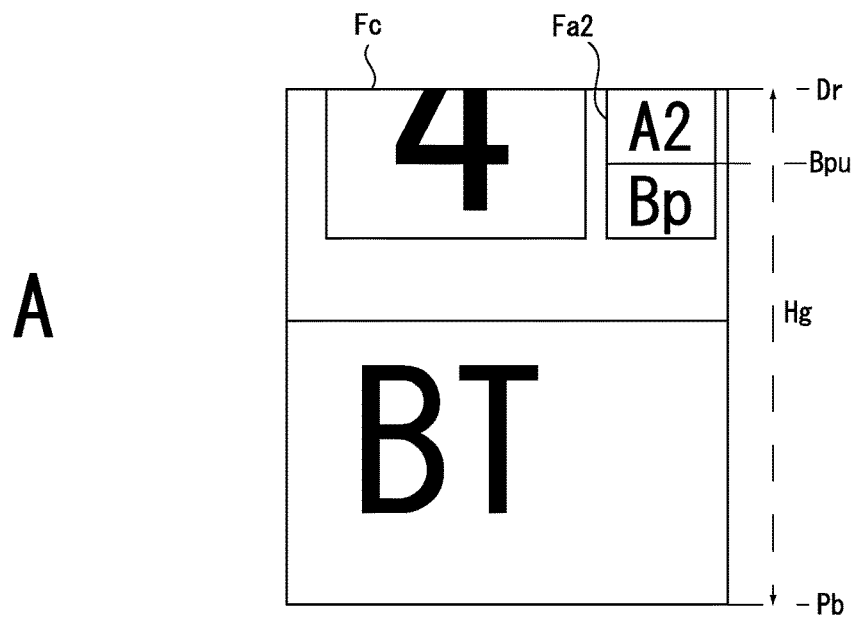
A
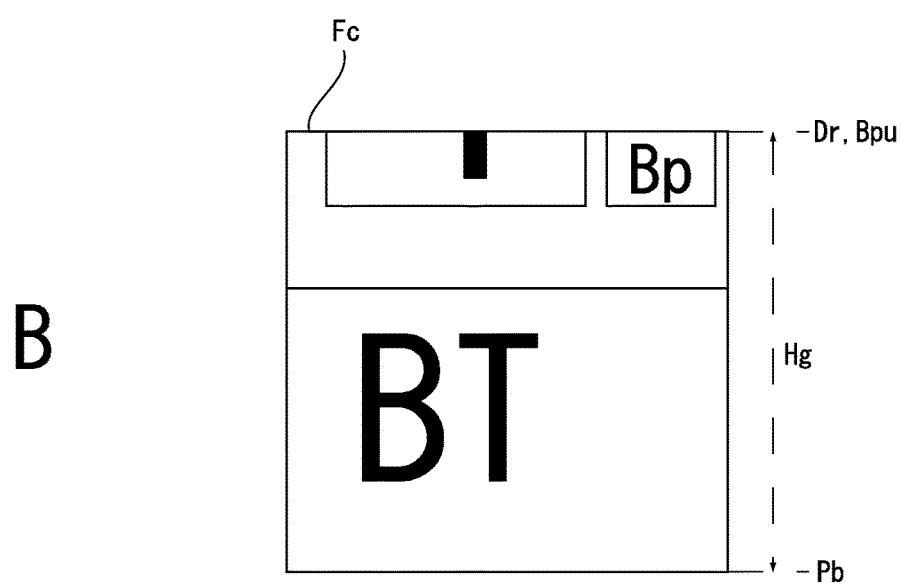
B

Fig.7
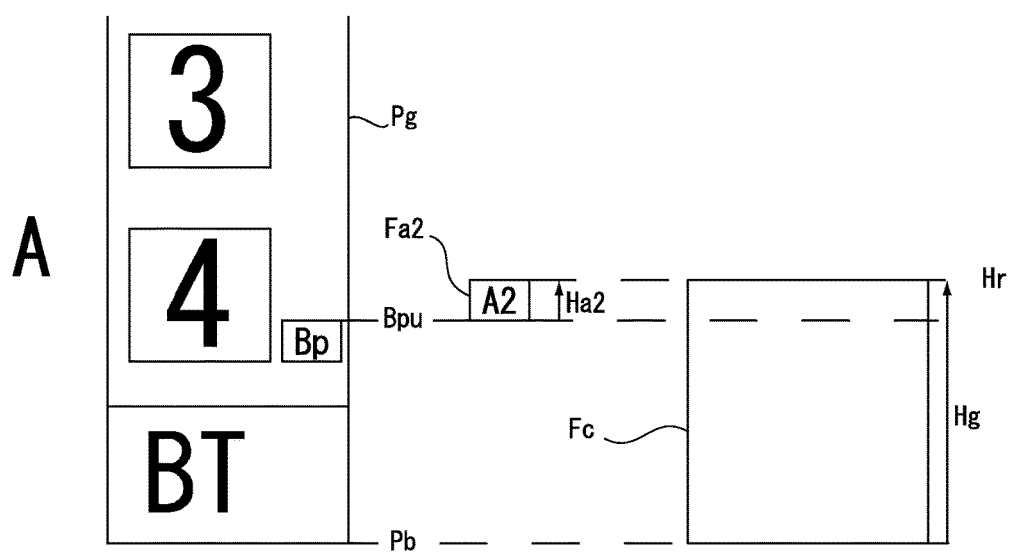
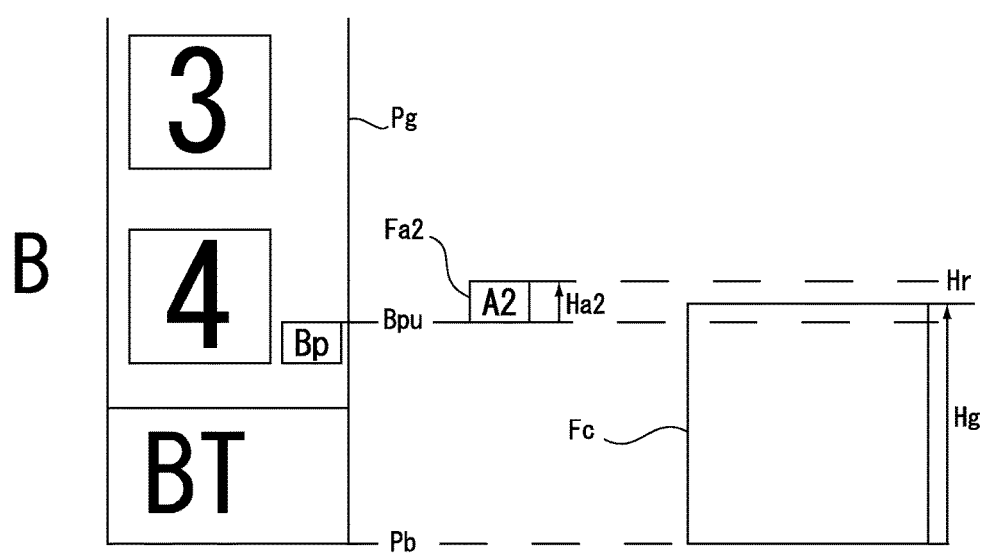

INFORMATION PROCESSING DEVICE, DISPLAY CONTROL METHOD, PROGRAM AND STORAGE MEDIUM

TECHNICAL FIELD

The present invention relates to a technical field about an information processing device performing display control for a web page having at least a first advertisement frame and a second advertisement frame placed below the first advertisement frame, the advertisement frames in which advertisements are displayed, and a display control method for the device, as well as about a program for implementing the information processing device and the display control method, and a storage medium having the program stored thereon.

CITATION LIST

Patent Literature

Patent Literature 1: Japanese Unexamined Patent Application Publication No. 2013-57918
Patent Literature 2: International publication No. 2011/142486

BACKGROUND ART

Displaying advertisements on web pages is prevalent.

Usually, such an advertisement is fixedly placed at a predetermined position in a web page. As the web page is scrolled, the advertisement is typically pushed out of a display frame of the web page along with other content items in the page.

In contrast, Japanese Unexamined Patent Application Publication No. 2013-57918 and International Publication No. WO2011/142486, for example, disclose displaying an advertisement to follow scrolling. Such following display allows an advertisement to remain at a certain position in a display frame of a web page even when the web page is scrolled. As a result, the advertisement can be exposed for a longer period of time to enhance the advertising effectiveness. Since the advertisement behaves differently from other content items during scrolling, the advertisement can attract more attention, which also enhances the advertising effectiveness.

Further, as an example of displaying an advertisement to follow scrolling, International Publication No. WO2011/142486 suggests switching a displayed advertisement in an advertisement frame that follows scrolling to another advertisement. This allows scroll following display with high advertising effectiveness to be performed for multiple advertisements on a single web page.

SUMMARY OF INVENTION

Technical Problem

Unfortunately, with the above approach of switching between advertisements displayed in an advertisement frame fixed at a certain position in a display frame of a web page, a viewer may not notice that an advertisement has been changed to another advertisement. Especially when the advertisement before the switching and the advertisement after the switching look similar to each other, the switching to the other advertisement is hard to be noticed by the viewer.

The present invention aims to overcome the above inconvenience. An object of the present invention is, in performing scroll following display of at least two advertisements on a single web page, to enable noticeable switching between the advertisements displayed to follow scrolling, thereby enhancing the advertising effectiveness even for advertisements other than the first advertisement.

Solution to Problem

First, an information processing device according to the present invention is an information processing device performing display control for a web page having at least a first advertisement frame and a second advertisement frame placed below the first advertisement frame, the advertisement frames in which advertisements are displayed. The device includes a control unit performing a following display controlling process for causing the first advertisement frame to follow scrolling in response to a display reference position in a web page display frame of a web browser reaching a first follow-start position for the first advertisement frame as the web page is scrolled in the web page display frame, and causing the second advertisement frame to follow the scrolling in response to the display reference position reaching a second follow-start position for the second advertisement frame after termination of the following of the first advertisement frame.

Thus, first, the first advertisement frame starts following in response to the scrolling advancing to a position corresponding to the first follow-start position. In response to the scrolling advancing to a position corresponding to the second follow-start position after the termination of the following of the first advertisement frame, the second advertisement frame different from the first advertisement frame starts following.

Second, preferably, in the above information processing device according to the present invention, the control unit sets a follow-end position for the scrolling for a lowest advertisement frame so that a lower edge position of the lowest advertisement frame is not below an upper edge position of a bottom highest part when the scrolling advances to a position where a lower end position of the web page aligns with a lower edge position of the web page display frame, based on a height of the web page display frame and a height from the lower end position of the web page to the upper edge position of the bottom highest part where the upper edge position of the bottom highest part denotes the upper edge position of a part placed at an uppermost position among some parts in the web page, the part overlapping with in a vertical direction the lowest advertisement frame which is an advertisement frame placed at the lowest position in the web page, and the part being placed below the lowest advertisement frame before following.

Thus, the lowest advertisement frame does not overlap the bottom highest part when the scroll following display of the lowest advertisement frame is performed up to where the web page is scrolled to the end.

Third, preferably, in the above information processing device according to the present invention, the control unit sets a scroll following amount for each of the first advertisement frame and the second advertisement frame based on a designation.

Thus, the lowest advertisement frame does not overlap the bottom highest part when the scroll following display of the lowest advertisement frame is performed up to where the web page is scrolled to the end.

Fourth, preferably, in the above information processing device according to the present invention, the first advertisement frame overlaps the second advertisement frame in the vertical direction in the web page, the display reference position is set at an upper edge position of the web page display frame, the first follow-start position is set at an upper edge position of the first advertisement frame before following, and the second follow-start position is set at an upper edge position of the second advertisement frame before following. The control unit terminates the following of the first advertisement frame in response to a lower edge of the first advertisement frame reaching the upper edge position of the second advertisement frame before following, and the control unit starts the following of the second advertisement frame in response to the upper edge position of the web page display frame, the position which is the display reference position reaching the upper edge position of the second advertisement frame before following, the position which is the second follow-start position.

Thus, the following of the first advertisement frame is terminated in response to the lower edge of the first advertisement frame reaching the upper edge of the second advertisement frame before following, i.e., the first advertisement frame is gradually pushed out of the web page display frame as the scrolling advances. In response to the first advertisement frame being completely pushed out of the web page display frame, the following of the second advertisement frame is started.

A display control method according to the present invention is a display control method in an information processing device performing display control for a web page having at least a first advertisement frame and a second advertisement frame placed below the first advertisement frame, the advertisement frames in which advertisements are displayed. The display control method includes causing the first advertisement frame to follow scrolling in response to a display reference position in a web page display frame of a web browser reaching a first follow-start position for the first advertisement frame as the web page is scrolled in the web page display frame, and causing the second advertisement frame to follow the scrolling in response to the display reference position reaching a second follow-start position for the second advertisement frame after termination of the following of the first advertisement frame.

The display control method realizes the same advertisement display as realized by the above-described information processing device.

Further, a program according to the present invention is a program causing an information processing device to perform a process that is to be performed as the above display control method.

Yet further, a storage medium according to the present invention is a program having the above program stored thereon.

The program and the storage medium implement the above information processing device.

The present invention can enable noticeable switching between advertisements displayed to follow scrolling, thereby enhancing the advertising effectiveness even for advertisements other than the first advertisement.

BRIEF DESCRIPTION OF THE DRAWINGS

FIG. 6 is a diagram for describing the case in which the content of the web page cannot be completely displayed;

FIG. 7 is a diagram for describing how a follow-end position for a second advertisement frame is set in the embodiment;

DETAILED DESCRIPTION OF THE EMBODIMENTS

Embodiments will be described below in the following order.
<1. Overview of Advertisement Display System>
<2. Configuration of Device>
<3. Advertisement Display in Embodiment>
<4. Process Steps>
<5. Summary of Embodiment>
<6. Program and Storage Medium>
<7. Variations>

1. Overview of Advertisement Display System

Figure 1:
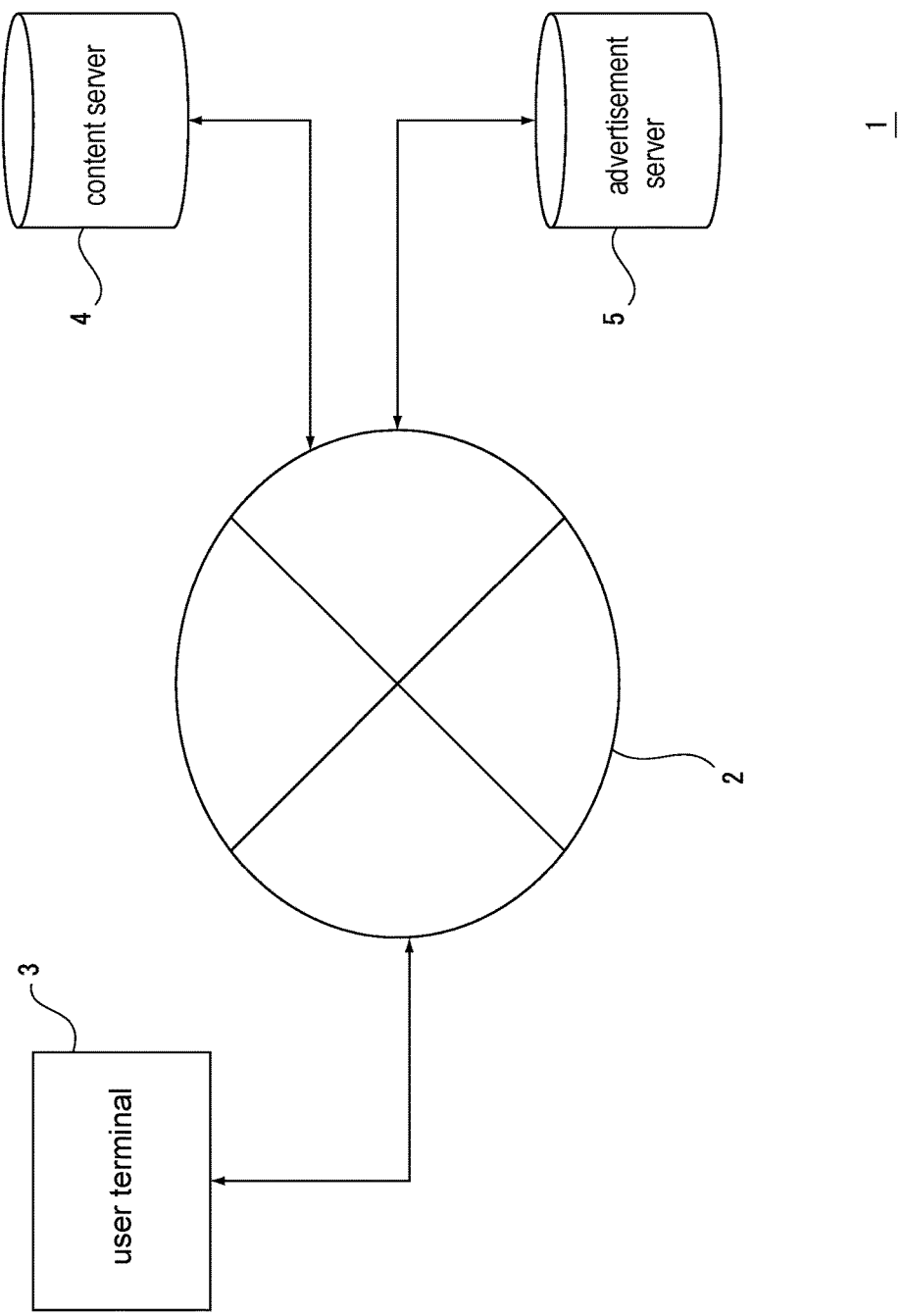
FIG. 1 is a diagram for describing the overview of an advertisement display system that includes information processing device according to the present invention.

FIG. 1 is a diagram for describing the overview of an advertisement display system 1 that includes information processing devices according to the present invention.

The advertisement display system 1 includes a user terminal 3, a content server 4, and an advertisement server 5 capable of communicating with each other over a network 2.

The user terminal 3 is an embodiment of the information processing device of the present invention. The user terminal 3 has a web browser installed therein and can display web pages provided by the content server 4.

The content server 4 stores page data, which is data necessary for displaying web pages. The page data includes structured document (e.g., HTML (Hyper Text Markup Language) document and XHTML document) files and image files that constitute the web pages. The content server 4 responds to a request from the user terminal 3 by sending page data corresponding to the request to the user terminal 3.

A web page illustrated in this example has advertisement frames Fa set therein, in which advertisements are to be displayed.

The advertisement server 5 stores advertisement data items, which is data necessary for displaying advertisements. The advertisement server 5 retrieves advertisement data items on advertisements to be displayed in the advertisement frames Fa in the web page from the stored advertisement data items, and sends the retrieved advertisement data items to the user terminal 3.

In this example, advertisements having content matching the content of the web page are to be displayed in the advertisement frames Fa. In order to realize such advertisement display, the page data in the content server 4 has pre-associated type information for identifying the type of the content of each web page. The advertisement data items in the advertisement server 5 is managed based on the type information. For example, the type information may include types A, B, and C. In the advertisement server 5, the type information "type A" may be associated with advertisement data items having content of the type A, and the type information "type B" may be associated with advertisement data items having content of the type B. Similarly, the type information "type C" may be associated with advertisement data items having content of the type C.

When a request for a web page is received from the user terminal 3, the content server 4 sends, to the advertisement server 5, type information associated with page data on the web page, and identification information (e.g., the IP address) on the requesting user terminal 3.

The advertisement server 5 sends, to the requesting user terminal 3, advertisement data items with associated type information matching the type information received from the content server 4 among the stored advertisement data items.

The user terminal 3 performs the process of displaying the web page based on the page data received from the content server 4, and the process of displaying advertisements in the advertisement frames Fa in the web page based on the advertisement data items received from the advertisement server 5.

Generally, there are many advertisements that fit a web page requested by the user terminal 3 (i.e., advertisements with associated type information matching the type information associated with the web page). The advertisement server 5 therefore retrieves as many advertisements as the number of advertisement frames Fa in the web page among the many advertisements and sends the retrieved advertisements to the user terminal 3.

Specifically, in this example, the advertisements are retrieved based on a bid price that is set for each advertisement. For example, the bid price may be the price charged per unit of clicks, such as CPC (Cost Per Click), or the price charged per unit of impressions, such as CPM (Cost Per Mille).

Accordingly, each advertisement data item in the advertisement server 5 has associated information on the bid price for the advertisement. If multiple advertisement data items exist that fit the web page requested by the user terminal 3, the advertisement server 5 retrieves as many advertisement data items as the number of advertisement frames Fa in the web page based on the bid price information associated with the advertisement data items. For example, if the web page contains X number of advertisement frames, the top X number of advertisement data items with the highest bid prices are retrieved.

Also, in this example, like what is called listing advertisement, an advertisement with a higher bid price is displayed in an advertisement frame Fa at a higher position in the web page.

Therefore, for the advertisement data retrieved as above, the advertisement server 5 generates instruction information for displaying an advertisement data item with a higher bid price in an advertisement frame Fa at a higher position, and sends the instruction information to the user terminal 3.

Various examples may be contemplated for the configuration of the network 2 in FIG. 1. For example, the network 2 may be the Internet, an intranet, an extranet, LAN (Local Area Network), CATV (Community Antenna TeleVision) communication network, VPN (Virtual Private Network), telephone line network, mobile communication network, or satellite communication network.

Various examples may also be contemplated for a communication medium that entirely or partially forms the network 2. For example, wired media such as based on IEEE (Institute of Electrical and Electronics Engineers) 1394, USB (Universal Serial Bus), power line transmission, and telephone line, or wireless media such as based on infrared (such as IrDA (Infrared Data Association)), Bluetooth®, 802.11 wireless, mobile telephone network, satellite line, and terrestrial digital network, may be available.

2. Configuration of Device

Figure 2:
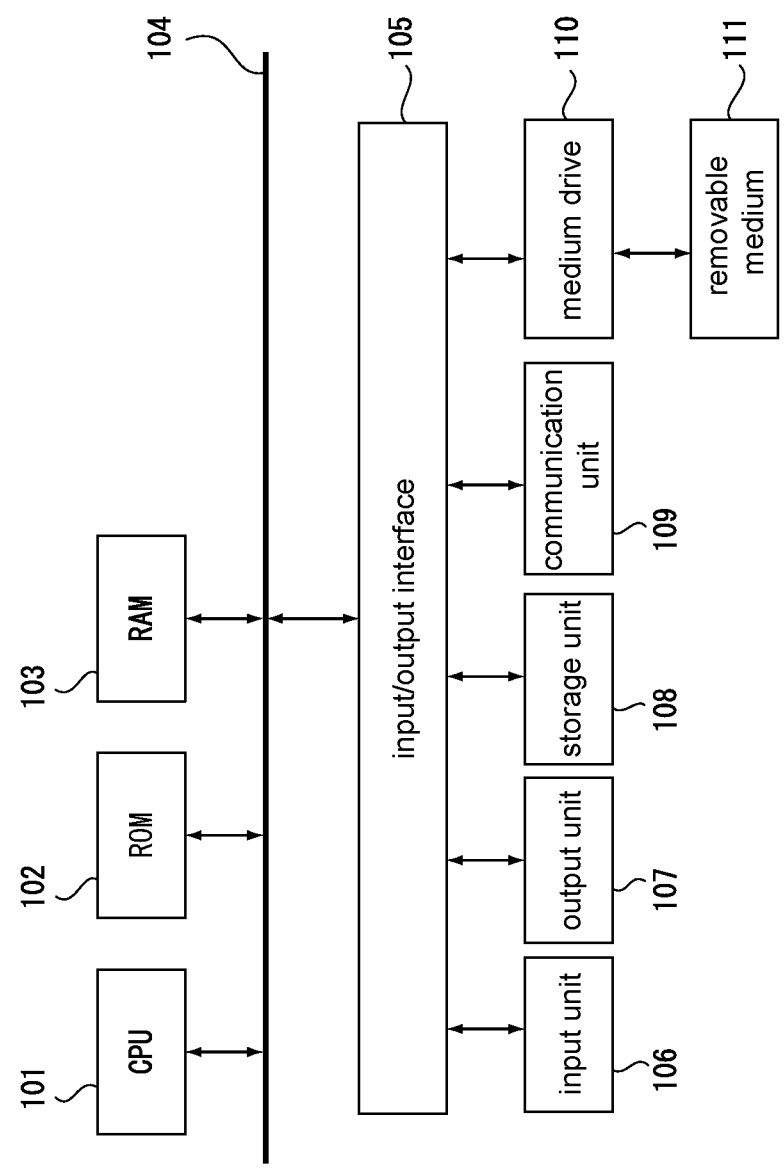
FIG. 2 is a block diagram of a computer device in an embodiment.

Now, a block diagram in FIG. 2 shows a hardware configuration of the information processing device implementing each of the user terminal 3, the content server 4, and the advertisement server 5 shown in FIG. 1. Each of the user terminal 3, the content server 4, and the advertisement server 5 may be implemented as a computer device as shown in FIG. 2 capable of information processing and information communication.

In FIG. 2, a CPU (Central Processing Unit) 101 of the computer device performs various processes according to programs stored in a ROM (Read Only Memory) 102 or programs loaded into a RAM (Random Access Memory) 103 from a storage unit 108. Data necessary for the CPU 101 to perform various processes is also stored in the RAM 103 as appropriate.

The CPU 101, the ROM 102, and the RAM 103 are interconnected via a bus 104. An input/output interface 105 is also connected to the bus 104.

Connected to the input/output interface 105 are: an input unit 106 including a keyboard, mouse, and touch panel; an output unit 107 including a display such as an LCD (Liquid Crystal Display), CRT (Cathode Ray Tube), or organic EL (Electroluminescence) panel, and a speaker; a storage unit 108 including an HDD (Hard Disk Drive) and flash memory device; and a communication unit 109 performing communication processing over the network 2 and inter-device communication.

A medium drive 110 is also connected to the input/output interface 105 as necessary. A removable medium 111 such as a magnetic disk, optical disk, magneto-optical disk, or semiconductor memory is attached to the medium drive 110 as appropriate to write and read information to and from the removable medium 111.

The computer device is capable of uploading and downloading data and programs through communication by the communication unit 109, and transferring data and programs via the removable medium 111.

The CPU 101 performs processing operations based on various programs, so that information processing and communication are carried out for realizing operations related to the above-described advertisement display in each of the user terminal 3, the content server 4, and the advertisement server 5.

The information processing device implementing each of the user terminal 3, the content server 4, and the advertisement server 5 may not necessarily be configured as a single computer device as in FIG. 2, but may be configured as a system of multiple computer devices. The multiple computer devices may be configured as a system in a LAN or may be located remotely from each other, such as in a VPN using the Internet.

3. Advertisement Display in Embodiment

Figure 3:
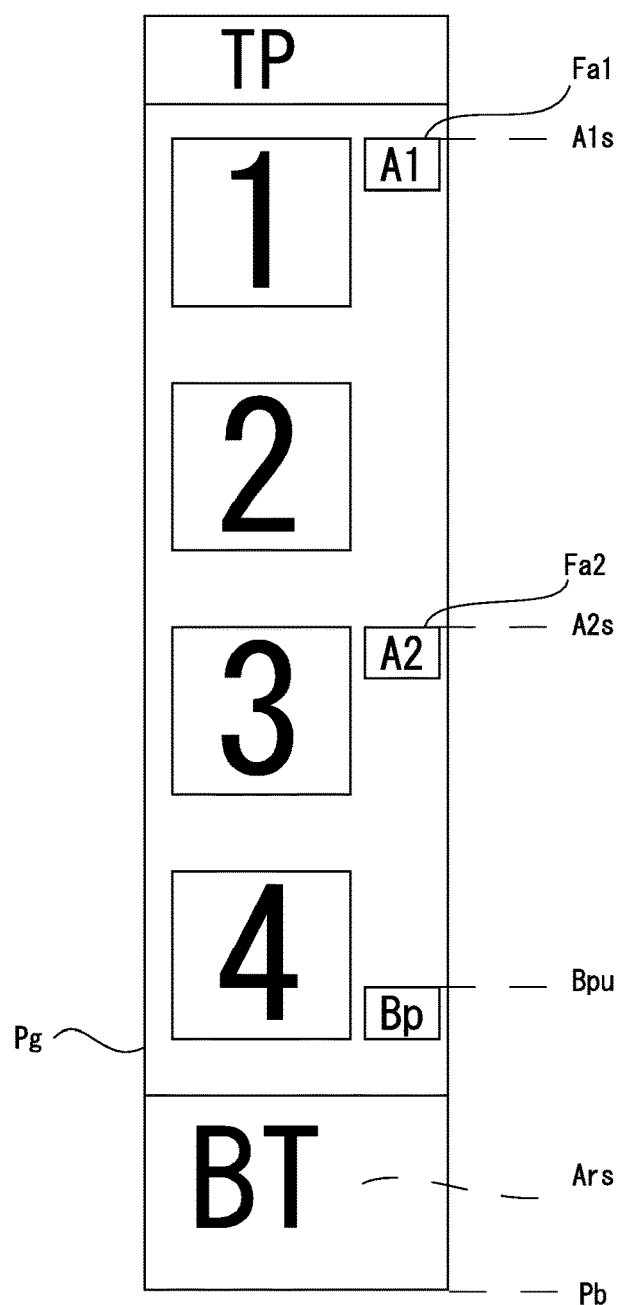
FIG. 3 is a diagram showing an exemplary layout of a web page on which advertisements are to be displayed in the embodiment.

FIG. 3 shows an exemplary layout of a web page (hereinafter referred to as a "web page Pg") on which advertisements are to be displayed in this embodiment.

The web page Pg contains parts (parts in which text, images, etc., constituting the content of the web page Pg are displayed) represented by "TP," "1," "2," "3," "4," "BT," and "Bp" shown, as well as at least two advertisement frames Fa.

The part "TP" is placed at the top of the web page Pg, and the part "BT" is placed at the bottom of the web page Pg. The parts "1" to "4" are sequentially placed from the upper side to the lower side of the web page Pg between the parts "TP" and "BT." The part "Bp" is placed beside the area where the parts "1" to "4" are placed.

In the exemplary web page Pg shown, only two advertisement frames Fa, a first advertisement frame Fa1 and a second advertisement frame Fa2, are set as shown. The first and second advertisement frames Fa1 and Fa2 are subjected to scroll following display to be described below.

As shown, the first and second advertisement frames Fa1 and Fa2 are in a vertical positional relationship in the web page Pg such that the first advertisement frame Fa1 is at an upper position and the second advertisement frame Fa2 is at a lower position. The horizontal positions of the first and second advertisement frames Fa1 and Fa2 in the web page Pg are beside the area where the parts "1" to "4" are placed. Specifically, in the exemplary web page Pg shown, the horizontal positions of the first and second advertisement frames Fa1 and Fa2 are the right side of the area where the parts "1" to "4" are placed. In this example, the first and second advertisement frames Fa1 and Fa2 are placed at the same horizontal position. In other words, the first and second advertisement frames Fa1 and Fa2 are placed at the same position with respect to the vertical direction of the web page Pg (i.e., the scrolling direction).

In the figures, advertisements displayed in the first and second advertisement frames Fa1 and Fa2 are represented by advertisements A1 and A2, respectively.

In this example, the horizontal position of the part "Bp" is the right side of the area where the parts "1" to "4" are placed, as with the first and second advertisement frames Fa1 and Fa2, and the vertical position of the part "Bp" is below the second advertisement frame Fa2.

Consequently, after the scroll following display of the second advertisement frame Fa2 is started, the second advertisement frame Fa2 following the scrolling may reach the part "Bp" as the scrolling advances, depending on the size of a web page display frame Fc. This will be described in detail below.

Hereinafter, the upper edge position of the first advertisement frame Fa1 before the start of the scroll following display of the first advertisement frame Fa1 will be referred to as an "upper edge position A1s." Similarly, the upper edge position of the second advertisement frame Fa2 before the start of the scroll following display of the second advertisement frame Fa2 will be referred to as an "upper edge position A2s."

Further, the upper edge position of the part "Bp" will be referred to as an "upper edge position Bpu," and the lower end position of the web page Pg will be referred to as a "page lower end position Pb."

The example in FIG. 3 illustrates the case in which all the advertisement frames Fa set in the web page Pg are subjected to the scroll following display. It is to be understood that advertisement frames Fa not subjected to the scroll following display may also be set in the web page Pg.

Figure 4:
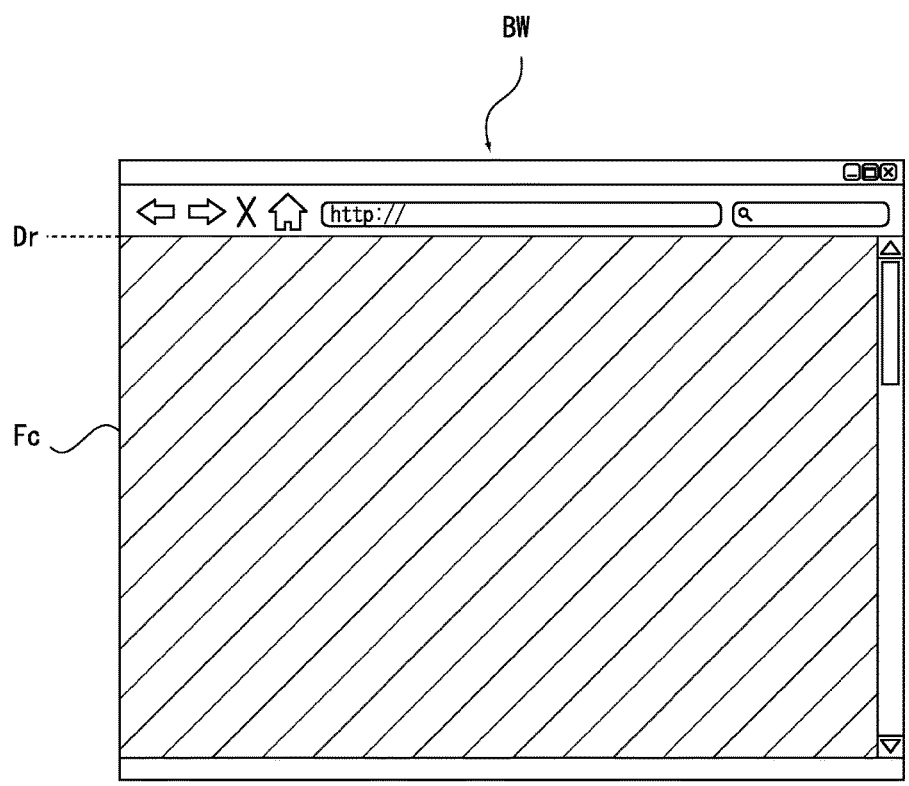
FIG. 4 is a diagram for describing a web page display frame.

FIG. 4 is a diagram for describing a web page display frame Fc in a window BW of a web browser. The window BW of the web browser is displayed on a display provided in the output unit 107 (FIG. 2) of the user terminal 3.

In the window BW, the web page Pg is displayed within the web page display frame Fc. If the entire web page Pg does not fit into the web page display frame Fc, the web page Pg can be scrolled.

Scrolling may be instructed with a mouse or a touch panel provided in the input unit 106 (FIG. 2) of the user terminal 3.

Hereinafter, a display reference position in the web page display frame Fc will be referred to as a "display reference position Dr." The display reference position Dr serves as a reference position indicating which portion in the web page Pg the web page display frame Fc displays.

In this example, the display reference position Dr is set at the upper edge position of the web page display frame Fc, as shown.

Figure 5:
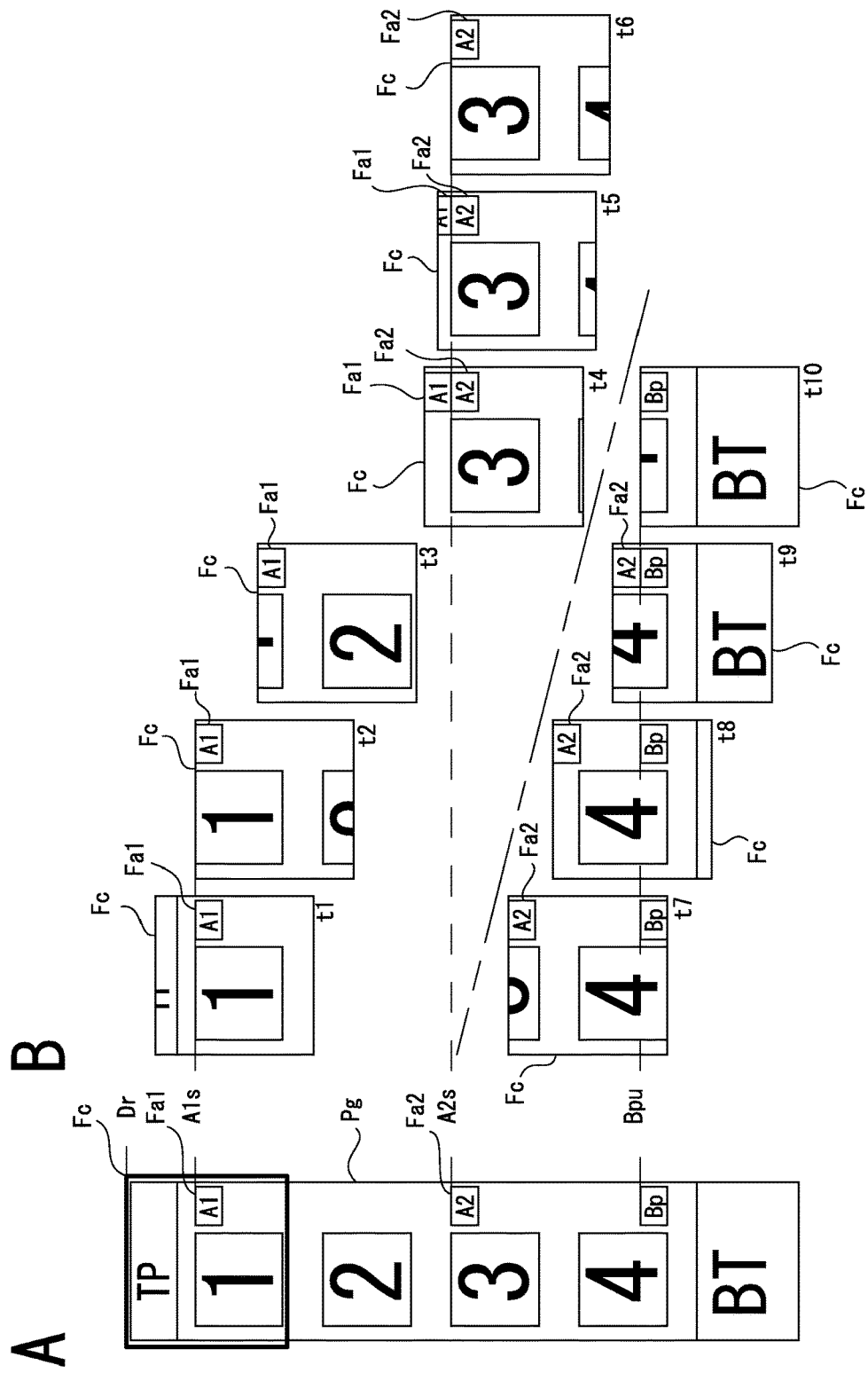
FIG. 5 is a diagram for describing how the advertisements are displayed in the embodiment.

FIG. 5 is a diagram for describing how the advertisements are displayed in this embodiment. FIG. 5A schematically shows the relationship between the web page Pg and the web page display frames Fc. FIG. 5B schematically shows transitions of the content displayed in the web page display frame Fc as the web page Pg is scrolled.

As shown in FIG. 5A, it is assumed that the web page display frame Fc is smaller in size than the web page Pg; the vertical length of the web page display frame Fc is shorter than the whole length (from the upper end to the lower end) of the web page Pg. That is, to display the content of the web page Pg to the end, the web page Pg needs to be scrolled.

When display of the web page Pg is first started in the web page display frame Fc, the upper edge position (the display reference position Dr) of the web page display frame Fc aligns with the upper end of the web page Pg, as shown in FIG. 5A (the initial display state of the web page Pg).

FIG. 5B shows temporal transitions during continuous scrolling from the initial display state through times t1 to t10, as well as the content displayed in the web page display frame Fc at each time t.

In this embodiment, the scroll following display of the first advertisement frame Fa1 is started in response to the upper edge position of the web page display frame Fc reaching the upper edge position A1s of the first advertisement frame Fa1 as shown at time t2 as the page is scrolled. As represented by the transition from time t2 to time t3, the scroll following display is performed by keeping the advertisement frame Fa in question fixed at a certain position in the web page display frame Fc. Specifically, in this example, the upper edge of the advertisement frame Fa in question is kept aligned with the upper edge position of the web page display frame Fc. At this point, in this example, the advertisement frame Fa following the scrolling remains at the same horizontal position as before the start of the following, so that the horizontal position of the advertisement frame Fa is unchanged even after the start of the following.

After the start of the scroll following display of the first advertisement frame Fa1, the scroll following display of the first advertisement frame Fa1 is terminated when the lower edge of the first advertisement frame Fa1 reaches the upper edge position A2s of the second advertisement frame Fa2 as shown at time t4. Since the scroll following is terminated, the first advertisement frame Fa1 is scrolled out along with other parts in the web page Pg. Thus, the first advertisement frame Fa1 after the termination of the following is pushed out of the web page display frame Fc as the scrolling advances (the transition from time t4 to time t5).

When the scrolling further advances and the upper edge position of the web page display frame Fc reaches the upper edge position A2s of the second advertisement frame Fa2 as shown at time t6, the scroll following display of the second advertisement frame Fa2 is started. In other words, in response to the first advertisement frame Fa 1 after the termination of the scroll following display being completely pushed out of the web page display frame Fc, the scroll following display of the second advertisement frame Fa2 is started.

In FIG. 5B, the transition from time t7 to time t8 represents the scroll following display of the second advertisement frame Fa2.

As will be described below, the scroll following display of the second advertisement frame Fa2 is terminated in response to the upper edge position of the web page display frame Fc, i.e., the display reference position Dr, reaching a follow-end position A2e for the second advertisement frame Fa2.

As will also be described below, in order to prevent failure to completely display the content of the web page Pg due to the following display, the follow-end position A2e for the second advertisement frame Fa2 in this example is variable depending on the relationship between the layout of the web page Pg and the size of the web page display frame Fc. Details of how to set the follow-end position A2e for the second advertisement frame Fa2 will be described below.

The example in FIG. 5B illustrates the case in which the follow-end position A2e is set at a position higher than the upper edge position Bpu of the part "Bp" by the height of the second advertisement frame Fa2. In this case, the scroll following display of the second advertisement frame Fa2 is terminated in response to the lower edge of the second advertisement frame Fa2 aligning with the upper edge position Bpu of the part "Bp" as shown at time t9. Time t10 represents the second advertisement frame Fa2 having been pushed out of the web page display frame Fc by the scrolling performed after the termination of the scroll following display of the second advertisement frame Fa2.

For the scroll following display as described above, an inappropriately set follow-end position A2e for the second advertisement frame Fa2 may cause failure to completely display the content of the web page Pg when the web page Pg is scrolled up to where the lower end of the web page display frame Fc reaches the page lower end position Pb. This is due to the relationship between the layout of the web page Pg and the size of the web page display frame Fc.

FIG. 6 is a diagram for describing this situation. FIG. 6A illustrates the case in which the vertical length (hereinafter referred to as a "height Hg") of the web page display frame Fc is set to be relatively long with respect to the web page Pg. FIG. 6B illustrates the case in which the height Hg of the web page display frame Fc is set to be relatively short with respect to the web page Pg.

In the case of FIG. 6A, when the lower end of the web page display frame Fc aligns with the page lower end position Pb, the lower end position of the second advertisement frame Fa2 following the scrolling is still not below the upper end position Bpu of the part "Bp." Consequently, the content of the web page Pg can be completely displayed when the scroll following display of the second advertisement frame Fa2 is performed up to where the page is scrolled to the end.

In contrast, if the height Hg of the web page display frame Fc is shorter than in the case of FIG. 6A, the content of the web page Pg cannot be completely displayed when the scroll following display of the second advertisement frame Fa2 is performed up to where the page is scrolled to the end. That is, with the layout of the web page Pg in this example, all or a portion of the part "Bp" cannot be displayed.

FIG. 6B shows an example in which the upper end position (the display reference position Dr) of the web page display frame Fc aligns with the upper end position Bpu of the part "Bp" when the web page is completely scrolled to where the lower end of the web page display frame Fc aligns with the page lower end position Pb. In this case, the scroll following display of the second advertisement frame Fa2 should be terminated before the page is scrolled to the end, taking into account the amount of scrolling required for pushing the second advertisement frame Fa2 out of the web page display frame Fc after the termination of the following of the second advertisement frame Fa2.

As understood from the description about FIGS. 6A and 6B, the part on the web page Pg that may not be displayed due to the scroll following display is the uppermost part placed among parts that overlap the second advertisement frame Fa2 in a vertical direction in the web page Pg, and are placed at position lower than the second advertisement frame Fa2 before following. Here, the second advertisement frame Fa2 may be rephrased as an advertisement frame Fa (hereinafter referred to as a "lowest advertisement frame") placed at the lowest position in the web page Pg among the advertisement frames Fa subjected to the scroll following display.

Hereinafter, the part defined as above will be referred to as a "highest part at the page bottom." The upper edge position of this highest part at the page bottom will be referred to as an "upper edge position of the bottom highest part." In the web page Pg with the layout of FIG. 3 discussed in this example, the upper edge position Bpu of the part "Bp" corresponds to the upper edge position of the bottom highest part.

FIG. 7 is a diagram for describing how the follow-end position A2e for the second advertisement frame Fa2 is set for enabling the content of the web page Pg to be completely displayed. FIG. 7A illustrates the case in which the scroll following display of the second advertisement frame Fa2 is possible until the web page is scrolled to the end, as in FIG. 6A. FIG. 7B illustrates the case in which the scroll following display of the second advertisement frame Fa2 should be terminated before the web page is scrolled to the end, as in FIG. 6B.

As seen in FIG. 7A, the scroll following display of the second advertisement frame Fa2 is possible until the web page is scrolled to the end if the height Hg of the web page display frame Fc is above the height from the page lower end position Pb to the upper edge position of the bottom highest part (the upper edge position Bpu in this example) plus the height Ha2 of the second advertisement frame Fa2.

In this case, the follow-end position A2e for the second advertisement frame Fa2 is set at the position at the height Hg of the web page display frame Fc from the page lower end position Pb.

The above height from the page lower end position Pb to the upper edge position of the bottom highest part plus the height Ha2 of the second advertisement frame Fa2 will hereinafter be referred to as a "reference height Hr."

In contrast, if the height Hg of the web page display frame Fc is below the reference height Hr as in FIG. 7B, the follow-end position A2e for the second advertisement frame Fa2 is set at the position at the reference height Hr from the page lower end position Pb.

In this manner, the content of the web page Pg can be completely displayed as the second advertisement frame Fa2 is pushed out of the web page display frame Fc after the termination of the following of the second advertisement frame Fa2.

Figure 8:
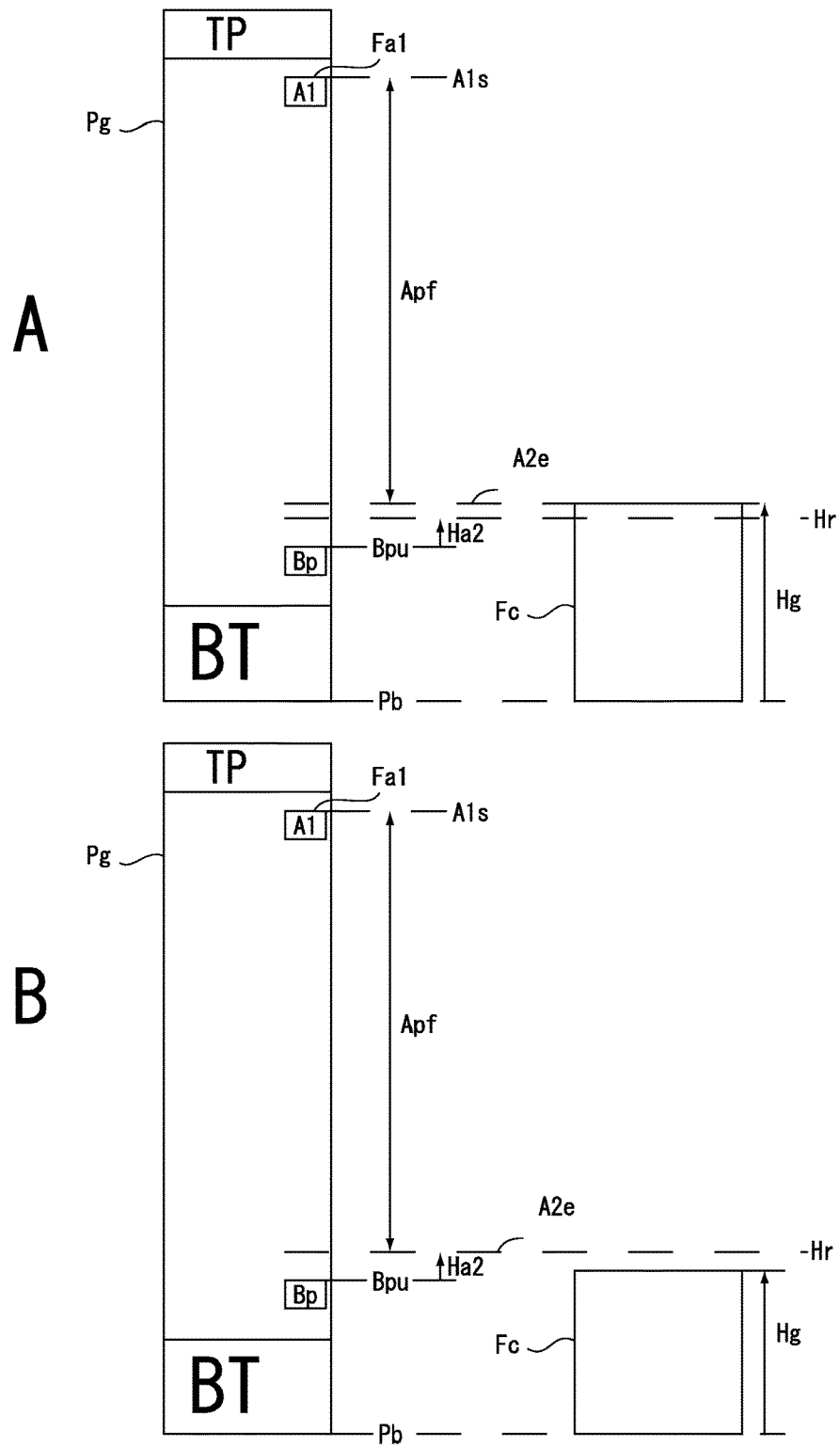
FIG. 8 is a diagram showing an example of the set follow-end position for the second advertisement frame.

FIG. 8A shows the positional relationship between the follow-end position A2e for the second advertisement frame Fa2 set in the case of FIG. 7A and the upper edge position A1s of the first advertisement frame Fa1. FIG. 8B shows the positional relationship between the follow-end position A2e for the second advertisement frame Fa2 set in the case of FIG. 7B and the upper edge position A1s of the first advertisement frame Fa1.

As described for preceding FIG. 5B, in this embodiment, the scroll following display of the first advertisement frame Fa1 is started in response to the display reference position Dr (the upper edge position of the web page display frame Fc) reaching the upper edge position A1s of the first advertisement frame Fa1 before following. In this sense, it can be said that the upper edge position A1s is the follow-start position (a first follow-start position) for the first advertisement frame Fa1.

Here, the range from this follow-start position for the first advertisement frame Fa1, i.e., the upper edge position A1s, to the follow-end position A2e for the second advertisement frame Fa2 (the follow-end position for the lowest advertisement frame) can be considered as the target range of the scroll following display of the advertisement frames Fa. Accordingly, the range from the upper edge position A1s to the follow-end position A2e, i.e., the range from the upper edge position A1s to the follow-end position for the lowest advertisement frame, will hereinafter be referred to as a "following display target range Apf."

Now, setting of scroll following amounts for the first and second advertisement frames Fa1 and Fa2 will be described.

In this example, the ratios of the scroll following amounts for the first and second advertisement frames Fa1 and Fa2 are fixed to predetermined ratios in advance. Specifically, in this example, the ratios (%) may be set as R1:R2=50%:50% by way of example, where "R1" denotes the ratio (%) of the scroll following amount for the first advertisement frame Fa1, and "R2" denotes the ratio (%) of the scroll following amount for the second advertisement frame Fa2.

These ratios R1 and R2 represent the ratios of the scroll following amounts for the first and second advertisement frames Fa1 and Fa2, respectively, in the "following display target range Apf" shown in FIGS. 8A and 8B.

There is a point to be noted here. In this example, the first advertisement frame Fa1 after the termination of the following is displayed to be pushed out of the web page display frame Fc as the page is scrolled. Therefore, in the following display target range Apf, a non-following display range of the height Ha1 of the first advertisement frame Fa1 exists between the range of the scroll following display of the first advertisement frame Fa1 and the range of the scroll following display of the second advertisement frame Fa2.

Figure 9:
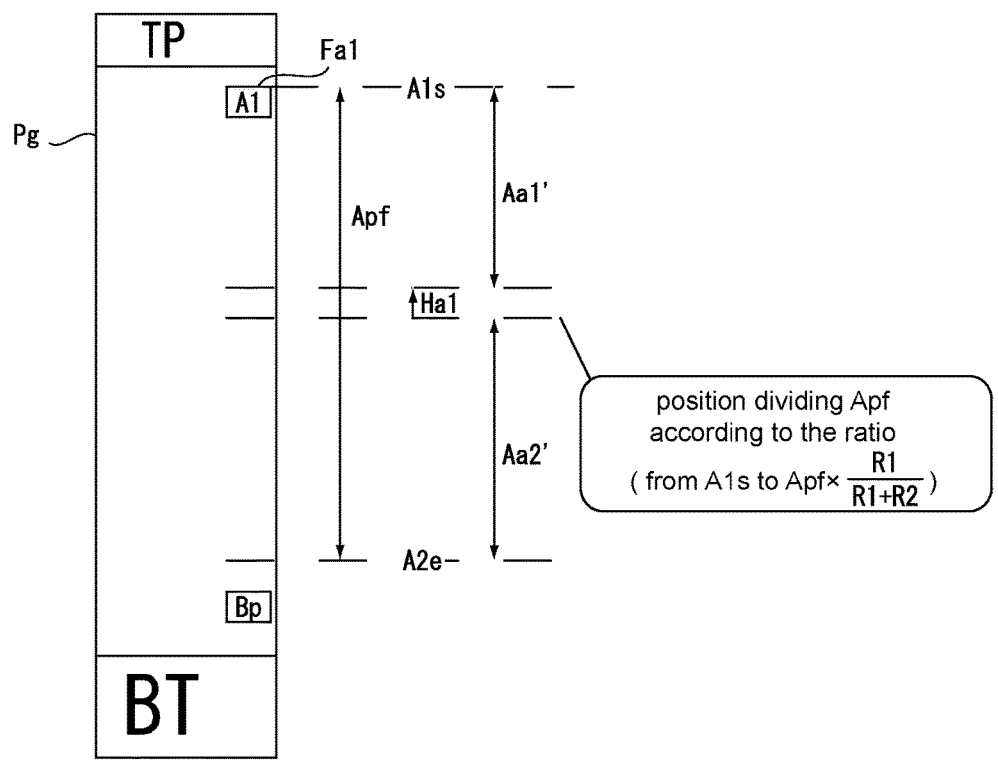
FIG. 9 is a diagram for describing a non-following display range.

FIG. 9 is a diagram for describing the non-following display range.

As shown, the non-following display range of the height Ha1 of the first advertisement frame Fa1 intervenes. If the follow-start position for the second advertisement frame Fa2 were simply set at a position dividing the following display target range Apf according to the ratios R1 and R2, the scroll following amount for the second advertisement frame Fa2 would be "the following display target range Apf×R2" as indicated by "Aa2'" in FIG. 9. However, the scroll following amount for the first advertisement frame Fa1 would be "the following display target range Apf×R1−Ha1" as indicated by "Aa1'" in FIG. 9. Therefore, proper scroll following amounts according to the ratios R1 and R2 would not be able to be realized.

Taking this into account, the follow-end position A1e for the first advertisement frame Fa1 is set with reference to "the following display target range Apf−the height Ha1" rather than the following display target range Apf itself. Specifically, the follow-end position A1e for the first advertisement frame Fa1 is set at the position lower than the upper edge position A1s by "(the following display target range Apf−the height Ha1)×{R1/(R1+R2)}."

Once the follow-end position A1e for the first advertisement frame Fa1 is set, the upper edge position A2s for the second advertisement frame Fa2 before following can be set.

That is, the upper edge position A2s is set at the position lower than the follow-end position A1e for the first advertisement frame Fa1 by the height Ha1 of the first advertisement frame Fa1.

Since the scroll following display of the second advertisement frame Fa2 is started in response to the display reference position Dr reaching the upper edge position A2s, it can be said that the upper edge position A2s is the follow-start position (a second follow-start position) for the second advertisement frame Fa2.

Thus, the first and second advertisement frames Fa1 and Fa2 are displayed according to the upper edge position A1s (the first follow-start position), the follow-end position A1e, the upper edge position A2s (the second follow-start position), and the follow-end position A2e set as described above. This enables performing the scroll following display of the first and second advertisement frames Fa1 and Fa2 with the scroll following amounts according to the ratios R1 and R2, and also preventing failure to completely display the content of the web page Pg due to the scroll following display.

Although the above description illustrates the case in which the two advertisement frames Fa are subjected to the scroll following display, three or more advertisement frames Fa may be subjected to the scroll following display. For three or more advertisement frames Fa, to enable the content of the web page Pg to be completely displayed, the follow-end position for the lowest advertisement frame may be set in the same manner as in setting the follow-end position A2e for the second advertisement frame Fa2 as described above.

To realize scroll following display with scroll following amounts according to the ratios of the scroll following amounts set for the respective advertisement frames Fa, the upper edge position before following may be set for each of the second and subsequent advertisement frames Fa in the same manner as described above, taking into account the non-following display range existing between the scroll-following ranges for the respective advertisement frames Fa.

4. Process Steps

Now, process steps for implementing an advertisement display method as the above-described embodiment will be described with reference to flowcharts in FIGS. 10 and 11.

Figure 10:
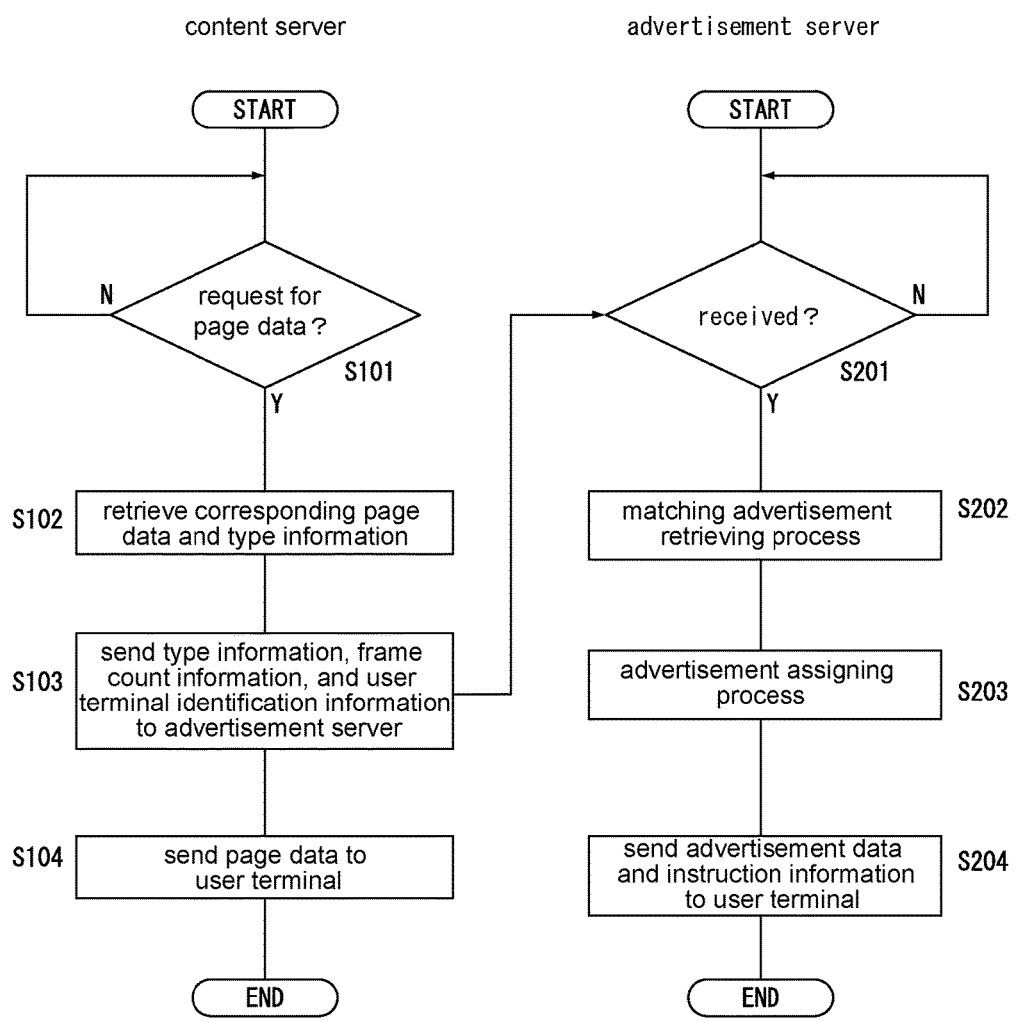
FIG. 10 is a flowchart showing processes performed by a content server and an advertisement server, respectively, in the embodiment.

FIG. 10 shows processes performed by the content server 4 and the advertisement server 5, respectively. The processes of the content server 4 to be described below are performed by the CPU 101 included in the content server 4. Similarly, the processes of the advertisement server 5 are performed by the CPU 101 included in the advertisement server 5.

In FIG. 10, the content server 4 waits for a request for page data from the user terminal 3 in step S101. If the request is received, the content server 4 retrieves corresponding page data and type information in step S102. That is, the content server 4 retrieves page data corresponding to the request, and type information associated with the page data.

In next step S103, the content server 4 sends, to the advertisement server 5, the retrieved type information, frame count information, and identification information on the requesting user terminal 3. The frame count information indicates the number of advertisement frames Fa set in the requested web page Pg and to be subjected to the scroll following display. This information may be obtained based on the page data retrieved in step S102.

The content server 4 further proceeds to next step S104, where it sends the retrieved page data to the requesting user terminal 3 and terminates the processes shown.

The advertisement server 5 waits in step S201 until receiving the type information, the frame count information, and the user terminal identification information sent by the content server 4. If these information items are received, the advertisement server 5 performs a matching advertisement retrieving process in step S202. In the matching advertisement retrieving process, the advertisement server 5 performs the process of retrieving, among advertisement data items having associated type information matching the received type information, as many advertisement data items as the number of advertisement frames Fa indicated by the above-described frame count information, based on bid price information associated with the advertisement data items. Specifically, if the received frame count information indicates X number of frames, the advertisement server 5 retrieves top X number of advertisement data items with the highest bid prices among the advertisement data items with the matching type information.

In next step S203, the advertisement server 5 performs an advertisement assigning process, in which it generates instruction information for designating assignment of the retrieved advertisement data items to the respective advertisement frames Fa. That is, in this example, for the advertisement data items retrieved in step S203, the advertisement server 5 generates instruction information for displaying an advertisement data item with a higher bid price in an advertisement frame Fa at a higher position.

The advertisement server 5 sends the advertisement data items retrieved in preceding step S202 and the instruction information generated in step S203 to the requesting user terminal 3 in step S204, and terminates the processes shown.

Figure 11:
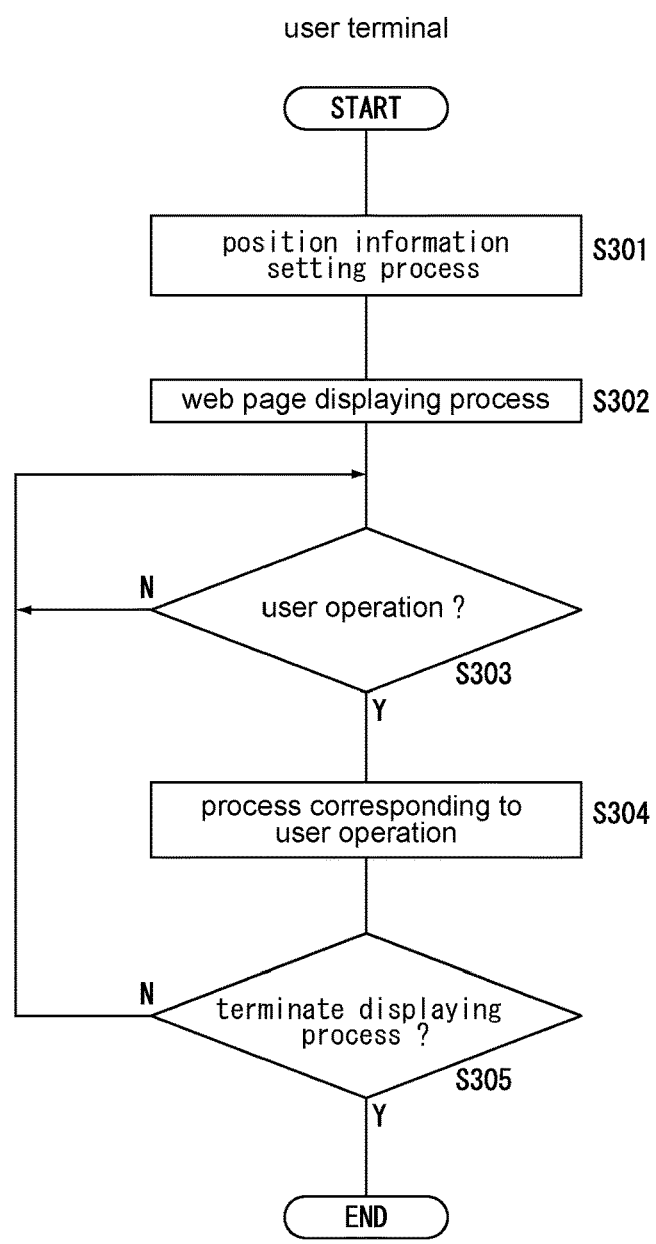
FIG. 11 is a flowchart showing processes performed by an information processing device (a user terminal) in the embodiment.

FIG. 11 shows processes performed by the user terminal 3. The processes shown in FIG. 11 are performed by the CPU 101 included in the user terminal 3.

The series of processes shown are related to displaying the web page Pg that is first requested. It is assumed that, at the start of the processes shown, the page data sent by the content server 4 and the advertisement data items and the instruction information sent by the advertisement server 5 have already been received.

In FIG. 11, first, the user terminal 3 performs a position information setting process in step S301, in which it sets the positions necessary for realizing the scroll following display in the above-described manner. That is, the user terminal 3 sets the follow-end position A1$e$ for the first advertisement frame Fa1 placed at the highest position in the page, and the upper edge position before following and the follow-end position for each of the second and subsequent frames Fa placed below the first advertisement frame Fa1. These positions are set based on the height Hg of the web page display frame Fc, the upper edge position (Bpu) of the bottom highest part, the height of each advertisement frame Fa (the length in the scrolling direction), and the ratio of the scroll following amount set for each advertisement frame Fa.

Specific manners of setting these positions have already been described and therefore will not be described again.

In this case, instruction information designating the ratios of the scroll following amounts may be written in the page data received from the content server 4.

In next step S302, the user terminal 3 performs a web page displaying process. That is, the user terminal 3 displays the web page Pg in the web page display frame Fc based on the received page data. The displaying process is for realizing the above-described initial display state, so that the web page Pg is initially displayed with its upper end aligned with the upper edge position of the web page display frame Fc.

The setting process in step S301 and the displaying process in step S302 may be performed in parallel and are not necessarily to be performed in the order of step S301 and step S302.

The user terminal 3 further waits for a user operation in next step S304. If a user operation is performed, the user terminal 3 performs a process corresponding to the user operation in step S304. The user operation here includes an operation for instructing scrolling of the web page Pg being displayed (hereinafter referred to as a "scroll operation") and an operation for closing the web page Pg being displayed.

As a result of performing the process corresponding to the user operation, the user terminal 3 determines whether or not to terminate the displaying process in step S305. That is, the user terminal 3 determines whether or not the operation for closing the web page Pg being displayed has been performed.

If it is determined that the user operation is not the operation for closing the displayed web page Pg and therefore the displaying process should not be terminated, the user terminal 3 returns to step S303 to wait for a user operation again. If it is determined that the operation for closing the web page Pg being displayed has been performed and therefore the displaying process should be terminated, the user terminal 3 terminates the processes shown.

Here, if the user operation is the scroll operation, the user terminal 3 performs, as the process in step S304, the process of scrolling the web page Pg within the web page display frame Fc and the process of starting/terminating the scroll following display of an appropriate advertisement frame Fa as the scrolling advances. Specifically, each time the display reference position Dr of the web page display frame Fc reaches the upper edge position before following (the follow-start position) and the follow-end position set for each advertisement frame Fa, the user terminal 3 performs the process of starting/terminating the scroll following display of that advertisement frame Fa.

In this example, the position information setting process in step S301, and the above process in step S304 where the scroll operation has been performed, are performed according to a script written in the page data, such as a JavaScript® script.

In other words, the content server 4 in this example stores page data having such scripts written therein.

5. Summary of Embodiment

As described above, the user terminal 3 in this embodiment is an information processing device performing display control for a web page Pg having at least a first advertisement frame Fa1 and a second advertisement frame Fa2 placed below the first advertisement frame Fa1. The device includes a control unit (CPU 101) performing a following display controlling process for causing the first advertisement frame Fa1 to follow scrolling in response to a display reference position Dr in a web page display frame Fc reaching a first follow-start position (A1s) for the first advertisement frame Fa1 as the web page Pg is scrolled in the web page display frame Fc, and causing the second advertisement frame Fa2 to follow the scrolling in response to the display reference position Dr reaching a second follow-start position (A2s) for the second advertisement frame Fa2 after termination of the following of the first advertisement frame Fa1.

Thus, first, the first advertisement frame Fa1 starts following in response to the scrolling advancing to a position corresponding to the first follow-start position. In response to the scrolling advancing to a position corresponding to the second follow-start position after the termination of the following of the first advertisement frame Fa1, the second advertisement frame different from the first advertisement frame Fa1 starts following.

This enables more noticeable switching between advertisements displayed to follow scrolling in comparison with the case of switching between displayed advertisements in one advertisement frame Fa that follows scrolling. Therefore, the advertising effectiveness can be enhanced even for advertisements other than the first advertisement.

In this embodiment, the control unit sets a follow-end position for the scrolling for the lowest advertisement frame (an advertisement frame Fa placed at the lowest position in the web page Pg) so that the lower edge position of the lowest advertisement frame is not below the upper edge position of the bottom highest part when the scrolling advances to a position where the lower end position Pb of the web page aligns with the lower edge position of the web page display frame Fc, based on the height of the web page display frame Fc and the height from the lower end position Pb of the web page to the upper edge position of the bottom highest part.

Thus, the lowest advertisement frame does not overlap the bottom highest part when the scroll following display of the lowest advertisement frame is performed up to where the web page Pg is scrolled to the end.

This enables the content of the web page to be completely displayed.

Further, in this embodiment, the control unit sets a scroll following amount for each of the first and second advertisement frames Fa1 and Fa2 based on a designation.

Thus, different scroll following amounts can be set for the first and second advertisement frames Fa1 and Fa2, respectively, based on the designation.

This enables the scroll following amount for each advertisement frame Fa to be varied according to details of a contract, such as a bid price.

Further, in this embodiment, the first advertisement frame Fa1 may overlap the second advertisement frame and Fa2 in the vertical direction in the web page Pg. The display reference position Dr is set at the upper edge position of the web page display frame Fc. The first follow-start position is set at the upper edge position A1s of the first advertisement frame Fa1 before following. The second follow-start position is set at the upper edge position A2s of the second advertisement frame Fa2 before following. The control unit terminates the following of the first advertisement frame Fa1 in response to the lower edge of the first advertisement frame Fa1 reaching the upper edge position A2s of the second advertisement frame Fa2 before following. The control unit starts the following of the second advertisement frame Fa2 in response to the upper edge position of the web page display frame Fc as the display reference position Dr reaching the upper edge position A2s of the second advertisement frame Fa2 before following as the second follow-start position.

Thus, the following of the first advertisement frame Fa1 is terminated in response to the lower edge of the first advertisement frame Fa1 reaching the upper edge of the second advertisement frame Fa2 before following, i.e., the first advertisement frame Fa1 is gradually pushed out of the web page display frame Fc as the scrolling advances. In response to the first advertisement frame Fa1 being completely pushed out of the web page display frame Fc, the following of the second advertisement frame Fa2 is started.

Displaying in the above manner can enable more noticeable switching between advertisements displayed to follow scrolling, thereby enhancing the advertising effectiveness even for advertisements other than the first advertisement.

6. Program and Storage Medium

The user terminal 3 as an embodiment of the information processing device of the present invention has been described above. A program in this embodiment is a program causing an information processing device (such as a CPU) to perform processes related to the scroll following display of the user terminal 3.

The program in this embodiment is a program causing an information processing device to perform a following display controlling process for causing the first advertisement frame Fa1 to follow scrolling in response to the display reference position Dr in the web page display frame Fc of the web browser reaching the first follow-start position for the first advertisement frame Fa1 as the web page Pg is scrolled in the web page display frame Fc, and causing the second advertisement frame Fa2 to follow scrolling in response to the display reference position Dr reaching the second follow-start position for the second advertisement frame Fa2 after termination of the following of the first advertisement frame Fa1.

The program enables the information processing device to be implemented as the above-described user terminal 3.

The program may be stored in advance in an HDD serving as an internal storage medium in a device such as a computer device, or may be stored in advance in ROM in a microcomputer having a CPU. The program may also be temporarily or permanently stored in a removable storage medium, such as semiconductor memory, a memory card, an optical disk, a magneto-optical disk, or a magnetic disk. The removable storage medium may be provided as what is called packaged software.

The program may be installed from the removable storage medium into a device such as a personal computer, as well as downloaded from a download site over a network such as a LAN or the Internet.

7. Variations

[7-1. First Variation]

The foregoing description illustrates the case in which the scroll following amount for each advertisement frame Fa is fixed in a predetermined ratio. However, the scroll following amount for each advertisement frame Fa may be variable depending on a predetermined condition. For example, the scroll following amount for each advertisement frame Fa may be varied as appropriate based on the bid price for the advertisement.

Figure 12:
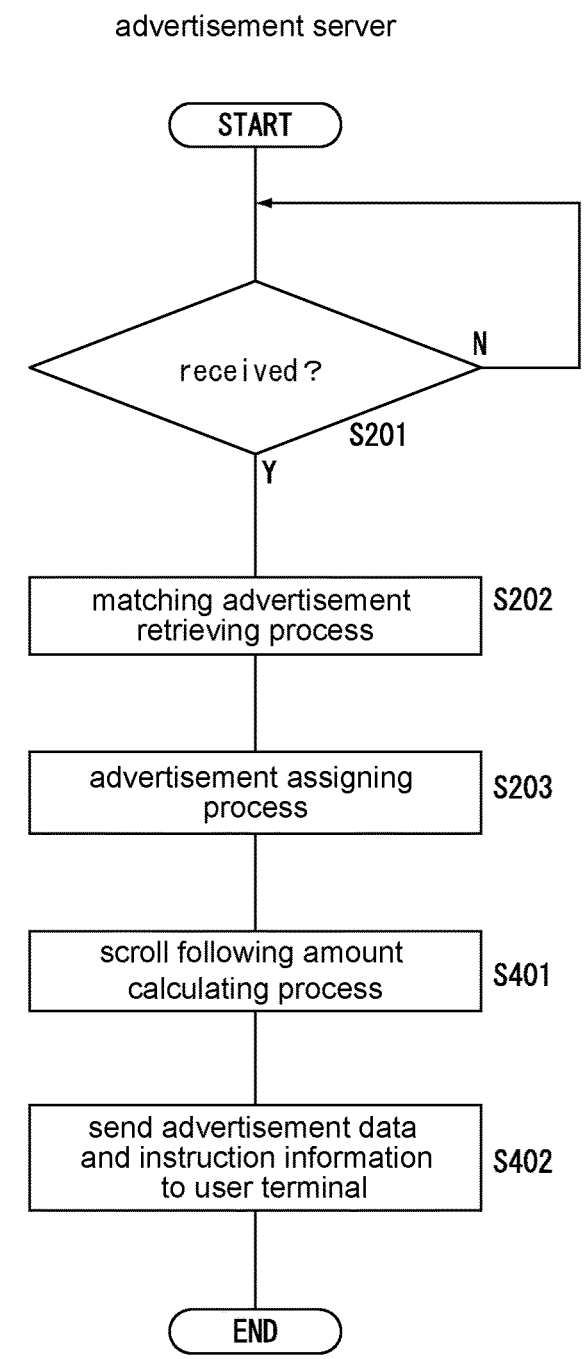
FIG. 12 is a flowchart showing processes in a first variation.

FIG. 12 shows exemplary process steps for setting a variable scroll following amount for each advertisement frame Fa based on the bid price for the advertisement. In the case illustrated in FIG. 12, the advertisement server 5 performs the processes.

Again in this case, first, the advertisement server 5 performs the processes in steps S201 to S203 described for FIG. 10. As a result of performing the processes in steps S201 to S203, the advertisement server 5 performs a scroll following amount calculating process in step S401. Specifically, for each of the advertisements assigned to the advertisement frames Fa in the advertisement assigning process in step S203, the advertisement server 5 calculates the ratio of the scroll following amount for the advertisement frame Fa based on the bid price information associated with the advertisement. For example, the ratio is calculated so that a higher ratio is set for an advertisement frame Fa of an advertisement with a higher bid price.

In next step S402, the advertisement server 5 in this case includes the information on the calculated ratio of the scroll following amount for each advertisement frame Fa into the instruction information and sends the retrieved advertisement data and the instruction information to the requesting user terminal 3.

The user terminal 3 in this case sets the upper edge position before following (the follow-start position) and the follow-end position for each advertisement frame Fa in the web page Pg based on the information on the ratio of the scroll following amount included in the instruction information received from the advertisement server 5. Specifically, as described above, the user terminal 3 determines the following display target range Apf as the range from the upper edge position A1s of the first advertisement frame Fa1 before following to the follow-end position for the lowest advertisement frame. Based on the following display target range Apf and the information on the ratio of the scroll following amount, the user terminal 3 sets each upper edge position before following (follow-start position) and follow-end position that has not yet been set.

Thus, the scroll following amount for each advertisement frame Fa according to the designated ratio is set. That is, the scroll following amount for each advertisement frame Fa according to the bid price is set.

In the advertisement assigning process in step S203, an advertisement with a higher bid price is assigned to an advertisement frame Fa at a higher position. Accordingly, setting the ratio of the scroll following amount according to the bid price as described above results in a larger scroll following amount for an advertisement frame Fa at a higher position, and a smaller scroll following amount for an advertisement frame Fa at a lower position.

However, the relationship between the position of each advertisement frame Fa and the scroll following amount may be arbitrarily defined in the present invention. The scroll following amount for each advertisement frame Fa may be set in other manners, for example setting a smaller scroll following amount for an advertisement frame Fa at a higher position, and a larger scroll following amount for an advertisement frame Fa at a lower position.

The above description illustrates the example in which the scroll following amount is set according to the bid price for each advertisement. However, the scroll following amount may be set based on other factors, for example the relevance to the requested web page Pg. For example, a larger scroll following amount may be set for an advertisement that is more relevant to the content of the requested web page Pg.

[7-2. Second Variation]

The above description illustrates the case in which the scroll following amount for each advertisement frame Fa is set according to the information that designates the "ratio" of the scroll following amount. Alternatively, the scroll following amount for each advertisement frame Fa may be set according to information that directly designates the "amount" rather than the "ratio."

However, setting the scroll following amount for each advertisement frame Fa according to information that directly designates the scroll following amount may cause concerns. That is, the scroll-following range for each advertisement frame Fa may overlap each other, or, reversely, the whole range capable of scroll following display in the web page Pg may not be able to be fully used. This is due to the entire length of the displayed web page Pg, or the height Hg of the web page display frame Fc.

If the scroll-following range for each advertisement frame Fa overlaps each other, the selected scroll following amount for each advertisement frame Fa is adjusted according to a predetermined condition to avoid the overlap. For example, according to a predetermined priority for each advertisement frame Fa (e.g., a higher priority for an advertisement frame Fa at a higher position), decreasing scroll following amounts are set for advertisement frames Fa with lower priorities.

If the whole range capable of scroll following display in the web page Pg cannot be fully used, the selected scroll following amount for each advertisement frame Fa is adjusted according to a predetermined condition to fully use the whole range. For example, according to a predetermined priority for each advertisement frame Fa (e.g., a higher priority for an advertisement frame Fa at a higher position), increasing scroll following amounts are set for advertisement frames Fa with higher priorities.

[7-3. Other Variations]

The above description illustrates the case in which advertisements that match the type of the content of the web page Pg are displayed in the advertisement frames Fa in the web page Pg. However, the advertisements to be displayed in the advertisement frames Fa may be selected according to other conditions.

For example, advertisements that match the activity history of the user of the user terminal 3 may be selected.

The above description illustrates the case in which the advertisements are assigned to the advertisement frames Fa based on bid prices. However, the advertisements may be assigned to the advertisement frames Fa based on conditions other than bid prices.

For example, an advertisement more relevant to the web page Pg containing the advertisement frames Fa may be assigned to an advertisement frame Fa at a higher position.

Further, the above description illustrates the case in which the scroll following display of the advertisement frames Fa is performed only on one side in the web page Pg. However, there is no limitation on the horizontal position of the scroll following display in the web page Pg. For example, the scroll following display of the first advertisement frame Fa1 may be performed on the right side in the web page Pg, and then the scroll following display of the second advertisement frame Fa2 may be performed on the left side in the web page Pg.

Yet further, the above description illustrates the case in which the scroll following display of the advertisement frames Fa is performed in such a manner that the upper edge of each advertisement frame Fa sticks to the upper edge of the web page display frame Fc. However, this is not limitation, and the advertisement frame Fa may be displayed at other positions in the web page display frame Fc during the scroll following display. For example, the advertisement frame Fa following the scrolling may be displayed in such a manner that the lower edge of the advertisement frame Fa aligns with the lower edge of the web page display frame Fc.

The above description illustrates the case in which the scroll following display of the lower advertisement fame Fa is started immediately in response to the upper advertisement frame Fa terminating the scroll following display and being completely pushed out of the web page display frame Fc. Alternatively, a gap may be provided between the scroll position where the upper advertisement frame Fa is completely pushed out of the web page display frame Fc and the scroll position where the scroll following display of the lower advertisement frame Fa is started. This may be achieved by, for example, causing the scroll following display of the upper advertisement frame Fa to be terminated before the lower edge position of the upper advertisement frame Fa reaches the upper edge position of the lower advertisement frame Fa before following.

REFERENCE SIGNS LIST

1 advertisement display system, 2 network, 3 user terminal, 4 content server, 5 advertisement server, 101 CPU, 106 input unit, 107 output unit, 109 communication unit

What is claimed is:

1. An information processing device performing display control for a web page having web page content and at least a first content frame of a plurality of content frames and a second content frame of the plurality of content frames placed below the first content frame, the plurality of content frames to be noticed by a viewer, wherein the plurality of content frames are displayed on a display of a user terminal in association with the web page content, the device comprising:
   at least one memory configured to store program code; and
   at least one processor configured to access said at least one memory and operate according to said program code, said program code including:
   first program code configured to cause at least one of said at least one processor to cause the first content frame to perform a first follow scrolling in response to a display reference position in a web page display frame of a web browser reaching a first follow-start position for the first content frame as the web page content is scrolled in the web page display frame,
   second program code configured to cause the at least one of said at least one processor to cause the second content frame to perform a second follow scrolling in response to the display reference position reaching a second follow-start position for the second content frame after termination of the first follow scrolling, and
   follow end position program code configured to cause the at least one of said at least one processor to set a follow-end position for the scrolling for a lowest content frame so that a lower edge position of the lowest content frame is not below an upper edge position of a bottom highest part when the scrolling advances to a position where a lower end position of the web page aligns with a lower edge position of the web page display frame, based on a height of the web page display frame and a height from the lower end position of the web page to the upper edge position of the bottom highest part, where the upper edge position of the bottom highest part denotes the upper edge position of a part placed at an uppermost position among some parts in the web page, the part overlapping with in a vertical direction the lowest content frame which is a content frame placed at the lowest position in the web page.

2. The information processing device according to claim 1, wherein said program code includes scroll following amount program code configured to cause the at least one of said at least one processor to cause setting a scroll following amount for each of the first content frame and the second content frame based on a designation.

3. The information processing device according claim 1, wherein
   a top edge of the second content frame meets a bottom edge of the first content frame in the vertical direction in the web page,
   the display reference position is set at an upper edge position of the web page display frame,
   the first follow-start position is set at an upper edge position of the first content frame before following, and
   the second follow-start position is set at an upper edge position of the second content frame before following, wherein:
   the first program code terminates the following of the first content frame in response to a lower edge of the first content frame reaching the upper edge position of the second content frame before following, and
   the second program code starts the following of the second content frame in response to the upper edge position of the web page display frame, the position which is the display reference position reaching the upper edge position of the second content frame before following, the position which is the second follow-start position.

4. The information processing device of claim 1, wherein said program code further includes:
   third program code configured to cause the at least one of said at least one processor to cause the second content frame to scroll with the web page content while appearing to push the first content frame out of view off the top of the display of the user terminal.

5. The information processing device according claim 2, wherein:
   a top edge of the second content frame meets a bottom edge of the first content frame in the web page,
   the display reference position is set at an upper edge position of the web page display frame,
   the first follow-start position is set at an upper edge position of the first content frame before following,
   the second follow-start position is set at an upper edge position of the second content frame before following, and
   wherein said program code includes third program code configured to cause the at least one of said at least one processor to:
   terminate the following of the first content frame in response to a lower edge of the first content frame reaching the upper edge position of the second content frame before following, and start the following of the second content frame in response to the upper edge position of the web page display frame, the position which is the display reference position reaching the upper edge position of the second content frame before following, the position which is the second follow-start position.

6. A display control method performing display control for a web page having at least a first content frame of a plurality of content frames and a second content frame of the plurality of content frames placed below the first content frame, the method comprising:

performing a first follow scrolling of the first content frame in response to a display reference position in a web page display frame of a web browser reaching a first follow-start position for the first content frame as web page content is scrolled in the web page display frame;

performing a second follow scrolling of the second content frame in response to the display reference position reaching a second follow-start position for the second content frame after termination of the first follow scrolling; and setting a follow-end position for the scrolling for a lowest content frame so that a lower edge position of the lowest content frame is not below an upper edge position of a bottom highest part when the scrolling advances to a position where a lower end position of the web page aligns with a lower edge position of the web page display frame, based on a height of the web page display frame and a height from the lower end position of the web page to the upper edge position of the bottom highest part, where the upper edge position of the bottom highest part denotes the upper edge position of a part placed at an uppermost position among some parts in the web page, the part overlapping with in a vertical direction the lowest content frame which is a content frame placed at the lowest position in the web page.

7. A non-transitory storage medium having stored thereon program code configured to cause an information processing device to perform a process, the information processing device performing display control for a web page having at least a first content frame of a plurality of content frames and a second content frame placed below the first content frame, the program causing the information processing device to:

perform a first follow scrolling of the first content frame in response to a display reference position in a web page display frame of a web browser reaching a first follow-start position for the first content frame as web page content of the web page is scrolled in the web page display frame, perform a second follow scrolling of the second content frame in response to the display reference position reaching a second follow-start position for the second content frame after a termination of the first follow scrolling, and set a follow-end position for the scrolling for a lowest content frame so that a lower edge position of the lowest content frame is not below an upper edge position of a bottom highest part when the scrolling advances to a position where a lower end position of the web page aligns with a lower edge position of the web page display frame, based on a height of the web page display frame and a height from the lower end position of the web page to the upper edge position of the bottom highest part, where the upper edge position of the bottom highest part denotes the upper edge position of a part placed at an uppermost position among some parts in the web page, the part overlapping with in a vertical direction the lowest content frame which is a content frame placed at the lowest position in the web page.

* * * * *